H. C. MANN.
PIPE JOINT.
APPLICATION FILED DEC. 29, 1916.

1,280,514.

Patented Oct. 1, 1918.

WITNESSES

INVENTOR
H.C.Mann.
BY
ATTORNEY

UNITED STATES PATENT OFFICE.

HERBERT C. MANN, OF OKLAHOMA, OKLAHOMA.

PIPE-JOINT.

1,280,514.   Specification of Letters Patent.   Patented Oct. 1, 1918.

Application filed December 29, 1916. Serial No. 139,573.

*To all whom it may concern:*

Be it known that I, HERBERT C. MANN, a citizen of the United States, residing at Oklahoma, in the county of Oklahoma and State of Oklahoma, have invented new and useful Improvements in Pipe-Joints, of which the following is a specification.

This invention relates to pipe joints and comprehends the provision of a means for making calked joints in pipes having bell and spigot ends, such as for instance water and gas means.

A very ordinary and widely known method of making such joints resides in placing in the bell end of the pipe section oakum or jute, filling said bell with hot lead, and subsequently calking the same. This calking is done at the top, with a consequent placement of all the strain at the weakest point of the bell, causing a great deal of trouble from cracked bells.

My invention, specifically stated, embodies a plurality of expansible split rings, each having associated therewith a split annulus of hemp or like material, the rings being adapted to be individually arranged within the bell end of the pipe section and subsequently calked, the construction and method of joining the pipes being such that the strain on the bell is placed at its strongest point, thereby eliminating to a large extent cracked bells.

The nature and advantages of the invention will be better understood from a consideration of the following detail description when taken in connection with the accompanying drawing, the invention residing in the construction, combination and arrangement of parts as claimed.

In the drawing forming part of this specification like numerals of reference indicate similar parts in the several views and wherein:—

Figure 1:
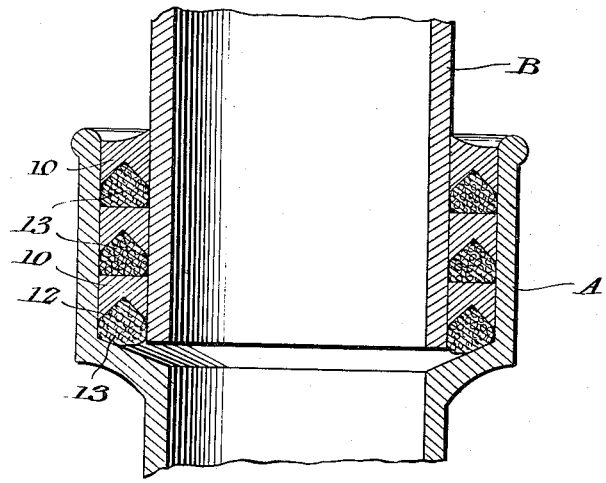
Figure 1 is a longitudinal sectional view through the joint.
Figure 2:
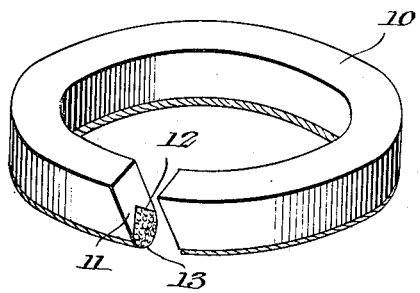
Fig. 2 is a perspective view of one of the rings.
Figure 3:
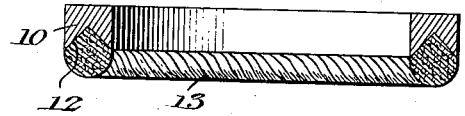
Fig. 3 is a sectional view therethrough.

Referring more particularly to the drawing in detail A and B indicate respectively the bell and spigot ends of the pipe sections, in connection with which the device forming the subject matter of my invention is employed.

In carrying out the invention use is made of a split ring of soft lead indicated at 10, which latter has its ends beveled as at 11. One side of the ring is provided with a circumferential groove 12 of any suitable depth and preferably of V-shaped formation in cross section. The groove is adapted for the reception of a split annulus of fiber, such as hemp or the like indicated at 13, the parts being molded together, and the fiber terminating flush, or substantially so with the extremities of the ring 10. It might here be stated that the ring with the annulus 13 as a unit can vary in size to accommodate itself to pipes of different diameters. The units as clearly shown in Fig. 1 are adapted to be arranged within the bell A and snugly embracing the spigot extremity B of one of the pipe sections to provide an effective fluid-tight joint between the respective sections of the pipe. The units are individually placed within the bell and subsequently calked, and when the first ring is positioned within the bell and tightly calked the strain on the bell is obviously placed at its strongest point. The next unit is placed within the bell and also calked which manifestly causes a spreading of the fiber annulus 13 as well as the ring 10 of the unit. This method is pursued with the required number of units necessary to fill the bell, and by reason of the construction and method of joining the pipe sections it will be noted that each joint is uniform, as each joint has the same amount of fiber and the same amount of lead. In accordance with my invention there should be no waste of material, and the sections are so calked that little if any possibility exists of the bell becoming cracked. As the units are placed within the bell prior to being calked, the bevel extremities of one unit is placed at a point diametrically opposite the extremities of the adjacent unit which had been previously placed in the bell. The invention is not only simple in its construction, but a great saving in labor and time is effected as the joint can be made in less time than required for the present day method for joining pipes of this character, and also considerably cheaper as there is no waste of material.

While it is believed that from the foregoing description the nature and advantages of the invention will be readily apparent I desire to have it understood that such changes in the construction and arrangement may be resorted to when desired as fall within the scope of what is claimed.

What is claimed is:—

In a pipe joint, the combination with pipe sections, one of which has a bell extremity for the reception of the adjacent end of the other section, of a packing for said joint consisting of a plurality of split rings of soft metal each ring having a flat side and a circumferential groove in its opposite side, said groove being of V-shaped formation in cross-section, and annulus of fiber having a substantially V-shaped portion fitted within the groove and molded to said rings, and a portion projecting beyond the corresponding side of the rings, said rings being arranged about one of said pipe sections in superimposed relation and calked within said bell of the other section, whereby the projecting portion of the fiber annulus is given a substantially flat surface and is spread against the flat side of the ring of the adjacent unit to provide an effective and fluid tight joint.

In testimony whereof I affix my signature.

HERBERT C. MANN.